Figure 7:
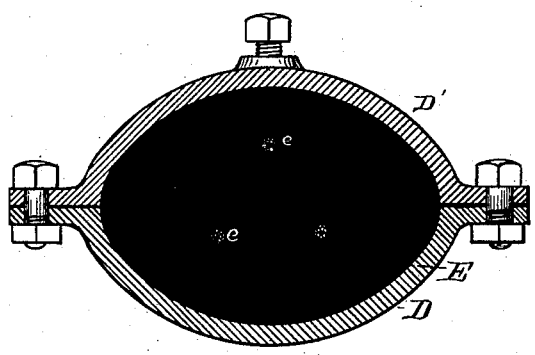

(No Model.) 2 Sheets—Sheet 1.
J. KRUESI.
ELECTRICAL CONDUCTOR AND CONNECTING DEVICE THEREFOR.
No. 296,185. Patented Apr. 1, 1884.
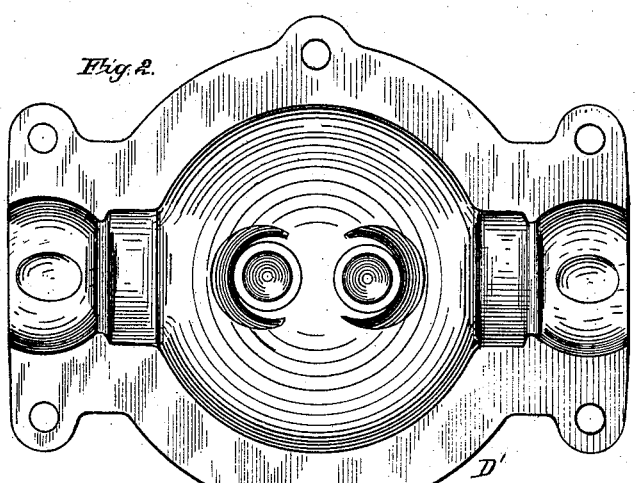
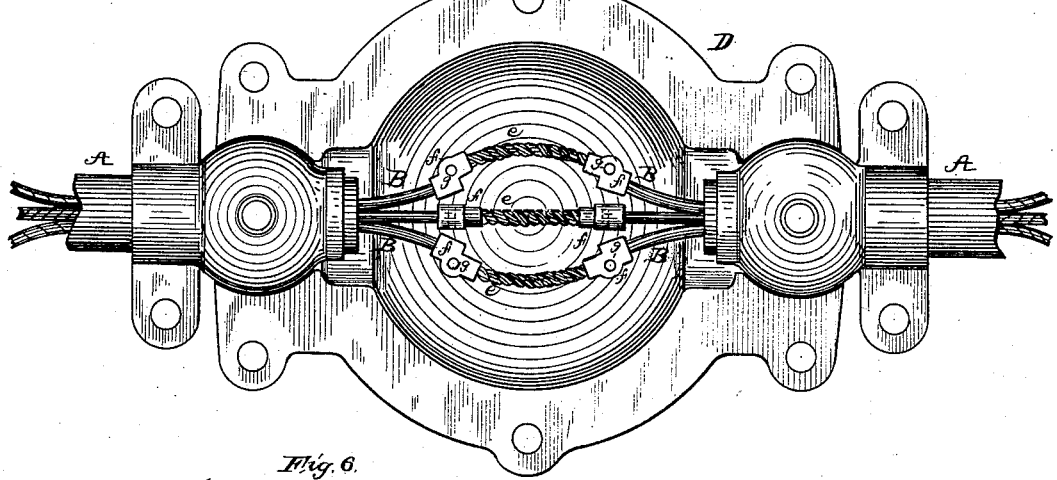
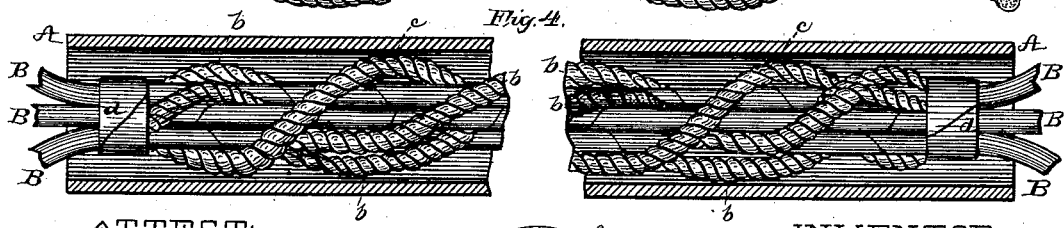
ATTEST: 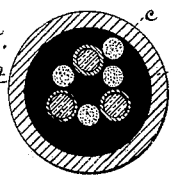 INVENTOR:

(No Model.) 2 Sheets—Sheet 2.

J. KRUESI.
ELECTRICAL CONDUCTOR AND CONNECTING DEVICE THEREFOR.

No. 296,185. Patented Apr. 1, 1884.

ATTEST:
E. C. Rowland
H. W. Seeley

INVENTOR:
John Kruesi
By Rich'd N. Dyer
Atty.

United States Patent Office.

JOHN KRUESI, OF BROOKLYN, ASSIGNOR TO THE ELECTRIC TUBE COMPANY, OF NEW YORK, N. Y.

ELECTRICAL CONDUCTOR AND CONNECTING DEVICE THEREFOR.

SPECIFICATION forming part of Letters Patent No. 296,185, dated April 1, 1884.

Application filed October 20, 1883. (No model.)

*To all whom it may concern:*

Be it known that I, JOHN KRUESI, of Brooklyn, in the county of Kings and State of New York, have invented a certain new and useful Improvement in Electrical Conductors and Connecting Devices Therefor, of which the following is a specification.

This invention relates to electrical conductors placed in inclosing and protecting tubes, and especially to the conductors of systems of electric lighting. It is designed with immediate reference to the three-wire or compensating system of Thomas A. Edison, although it is applicable to any conductors of which two or more are placed in an inclosing metallic or other tube and provided with a separating insulation of a material which is liquid when heated and becomes hard in cooling.

The first object I have in view is to efficiently separate the two or more conductors from each other and from the inclosing-tube, to maintain the said conductors in a central position within said tube, and to permit the liquid or semi-liquid insulating material to penetrate to all parts of the tube and between the conductors. Such material also saturates the fibers of the insulating-cords, rendering them water-proof, so that they assist in keeping moisture from reaching the conductors; and my second object is to provide good connections between the ends of the conductors, which connections are readily made and are not injuriously affected by the expansion and contraction due to variations in temperature.

In accomplishing the first-named object I wind spirally around each conductor a cord of insulating material, preferably with a long pitch to the spiral. These cords separate the conductors from one another. A similar cord is then wound spirally around all the conductors between the spirals of the separating-cords. Each conductor may or may not be wound with tape, or covered with other suitable insulation, and the conductors held apart by the cords may be bound together at certain points by insulating-tape or other suitable material. The spirally-wound bundle of conductors is then placed in an inclosing-tube, which is preferably of iron, (though other metals or wood might be used,) of such size that the outer windings of the spiral cords will come in contact with the inside of the tube. The liquid or semi-liquid insulating material is then poured into the tube and flows along the spiral convolutions of the cords, penetrating into all the interstices formed by the spirals and saturating the cords and completely insulating the conductors from each other and from the tube.

In accomplishing the second object of my invention the ends of the two lengths of tube containing the conductors to be joined are run into a junction-box of suitable construction, preferably one of those set forth in my prior patents and applications. The conductors protrude from the ends of the tube into the box, and the junction between them is formed by separate connecting-pieces, each of which consists of a number of small wires massed together, and having attached to each end, preferably by brazing, a metallic piece, to which the projecting end of the conductor is soldered in making the connections. Each of the end pieces is preferably provided with an eye, in which the end of a branch conductor is secured when it is desired to take off a derived circuit from the mains. The connecting-pieces, being each composed of a number of small wires, are flexible, and are bent when the connections are made. The expansions and contractions due to changes in temperature are taken up by the bent flexible connecting-pieces, and the junctions of the conductors are not therefore injuriously affected.

In the accompanying drawings, Figure 1 is a plan view of the interior of one-half of a junction-box with the conductors placed in it, and Fig. 2 a plan view of the other half. Fig. 3 is a view of one of the connecting-pieces; Fig. 4, a longitudinal section of an inclosing-tube containing the conductors; Fig. 5, a cross-section of the tube and conductors; Fig. 6, a view of one of the conductors, and Fig. 7 a cross-section of the junction-box.

Referring first to Figs. 4, 5, and 6, A is the iron inclosing-tube, which may be formed of any size to accommodate the proper number and size of conductors. B B B each represent a conductor. They are shown as each wrapped with an insulating-covering, *a*; but this may be omitted, if desired. Around each conductor is wound spirally a cord, *b*, preferably of fibrous insulating material, which keeps the conductors apart. Around the three conductors is wound, between the spirals of the other cords, a cord, c, similar to the other cords, which holds the conductors away from the tube A. This supporting-spiral prevents the tube and conductors from coming into contact by reason of the accidental crushing or bending of the tube or abnormal expansion of the copper. The tube is then filled with the insulating material C, (which is not shown in Fig. 4,) and such material is allowed to cool and harden. The conductors may be secured together by bands of tape d or in other suitable manner; or they may be placed in the tube without such securing means. Where the conductors in the tube are those of a feeding-circuit of a system, small auxiliary conductors are also placed in the tube, which are used to indicate at the central station the electrical condition at the terminals of the feeders. These wires are covered with insulation, and may or may not be provided with the spiral supports.

Referring to Figs. 1, 2, 3, and 7, D D' represent the two longitudinal halves of a junction-box having openings through which the ends of two tubes, A A, (the conductors B B of which are to be joined,) are introduced into the box, the conductors projecting beyond the ends of the tubes. The box is filled with insulation E, of the character already described. The conductors are joined through connecting-pieces e e. Each of these consists of a number of flexible wires twisted together, and is provided with solid-metal end pieces, f f, preferably brazed to the ends of the wires. In making the connections these end pieces are soldered to the ends of the conductors B B, and the connecting-pieces are bent out, as shown, for the purpose above described.

Each of the end pieces, f, is preferably provided with an eye, g, in which is secured, when necessary, the end of a branch conductor; or only those at one end of the connecting-strips may be so constructed where it is desirable to take off branch circuits only on one side of the main line.

I prefer to make the connecting-pieces e of less conductivity than the conductors which they are designed to join, so that variations in temperature caused by changes in current will affect these connecting-pieces first, and heat them so as to soften the insulation which surrounds them, whereby such insulation does not hinder their expansion.

The conductors shown in the drawings represent a main circuit of the Edison compensating system of electrical distribution. It is evident, however, that my invention is applicable to conductors for telegraphic and other purposes, as well as for electric lighting, and that any desired number of wires may be grouped in the inclosing-tube, or that each conductor B may be two or more insulated or uninsulated wires massed together.

What I claim is—

1. The combination of two or more electrical conductors, an inclosing-tube, a single insulating-support wound spirally upon each conductor, and an insulating material of the character described filling the tube, substantially as set forth.

2. The combination, with two or more electrical conductors and an inclosing-tube, of an insulating-support wound spirally around each conductor, and an insulating-support wound spirally around all the conductors, and sustaining them centrally in the tube, substantially as set forth.

3. The combination, with two or more electrical conductors and an inclosing-tube, of a spiral insulating-support around each conductor, a spiral insulating-support around all the conductors, and an insulating material of the character described filling the tube, substantially as set forth.

4. The combination, with two or more insulated electrical conductors and an inclosing-tube, of a spiral insulating-support around each conductor, a spiral insulating-support around all the conductors, and an insulating material of the character described filling the tube, substantially as set forth.

5. The combination, with two parts of an electrical conductor, of a device for permanently connecting them, consisting of a bent flexible conductor having end pieces brazed or soldered thereto, the ends of the joined conductor being attached to such end pieces, substantially as set forth.

6. The combination, with two parts of an electrical conductor, of a device for permanently connecting them, consisting of a bent flexible conductor formed of a number of wires massed together, and having solid end pieces soldered or brazed thereto, to which the ends of the joined conductor are connected, substantially as set forth.

7. The combination of a junction-box filled with fusible insulation, conductors entering the same, and connecting-pieces of less conductivity than the conductors, substantially as set forth.

8. The combination of a junction-box filled with fusible insulation, conductors entering the same, and flexible connecting-pieces of less conductivity than the conductors, substantially as set forth.

This specification signed and witnessed this 28th day of September, 1883.

JOHN KRUESI.

Witnesses:
H. W. SEELY,
E. H. PYATT.